UNITED STATES PATENT OFFICE.

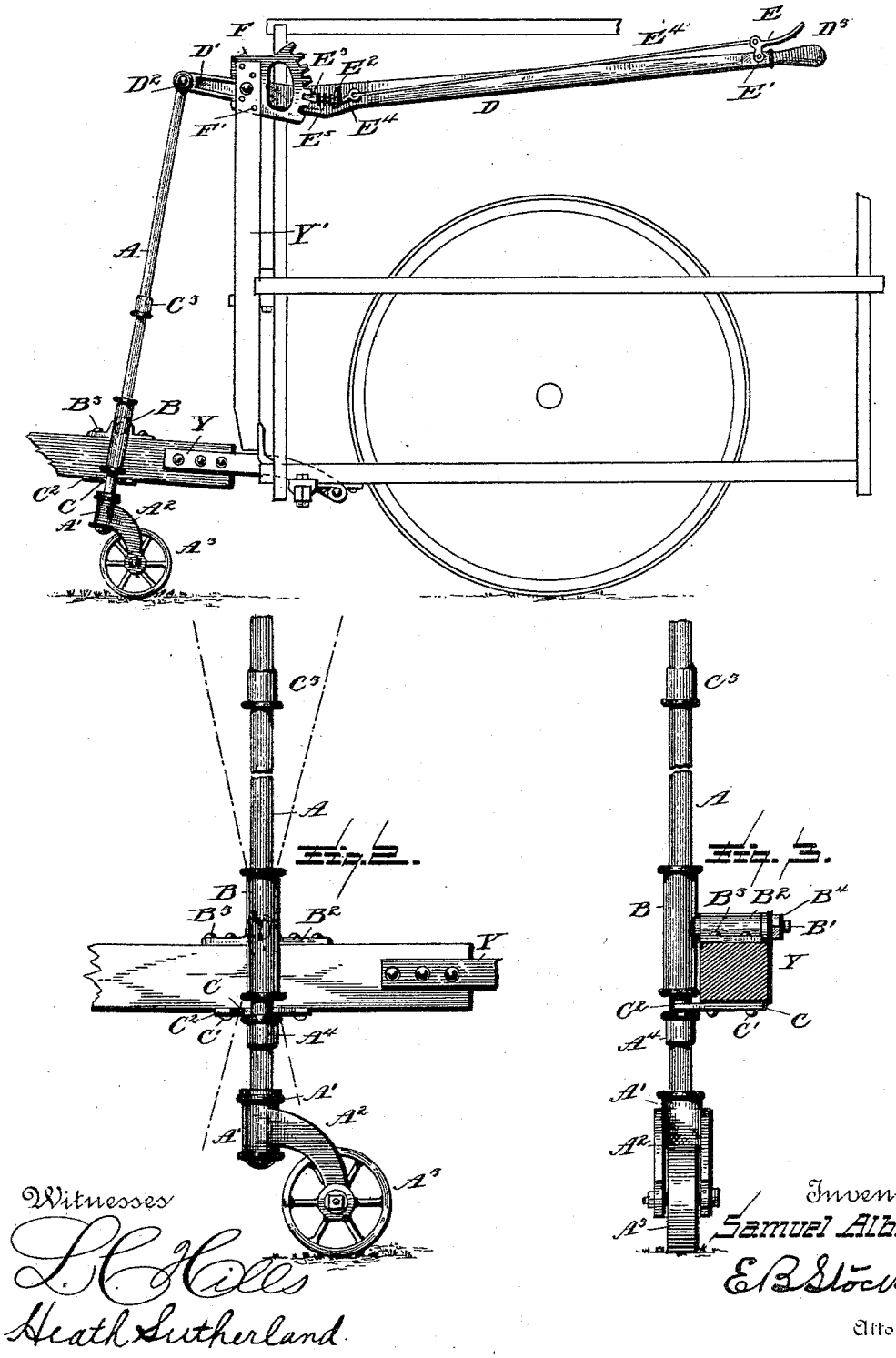

SAMUEL ALBRIGHT, OF GOOSE LAKE, IOWA.

CASTER FOR GRAIN-BINDERS.

SPECIFICATION forming part of Letters Patent No. 414,475, dated November 5, 1889.

Application filed May 27, 1889. Serial No. 312,257. (No model.)

*To all whom it may concern:*

Be it known that I, SAMUEL ALBRIGHT, a citizen of the United States, residing at Goose Lake, in the county of Clinton, State of Iowa, have invented certain new and useful Improvements in Casters for Grain-Binders, &c., of which the following is a specification, reference being had therein to the accompanying drawings.

This invention has relation to a caster attachment for the poles and tongues of grain-binders and similar two-wheeled vehicles, and to means for raising and lowering the front end of said machine or vehicle operated from the driver's seat, the main object being to take the weight of the machine off the horses' necks when traveling over rough and uneven ground, as it is apparent that when the machine is overbalanced the whole weight of the machine comes indirectly on the necks of the horses.

Other objects and advantages of the invention will appear in the following description, and the novel features thereof will be particularly pointed out in the claims.

Referring to the drawings, Figure 1 is a side elevation of a portion of a grain-binder provided with a caster and means for controlling the same, constructed in accordance with my invention. Fig. 2 is a side elevation, on a larger scale, of the caster, and Fig. 3 is a rear view of the same, showing the pole in cross-section.

Like letters refer to like parts in all the figures of the drawings.

A is a rod, of metal, of a suitable size and length, the end of which is snugly embraced by the sleeve $A'$ of the caster, said sleeve having the bifurcations $A^2$, in which is journaled the wheel $A^3$. On the rod A is the stop $A^4$, which limits the movement of the pole downward toward the caster.

Embracing loosely the rod A at a suitable point is the sleeve B, and projecting rearwardly therefrom is the spindle $B'$, the casing and its spindle forming a T. The spindle $B'$ is embraced by the bracket $B^2$, which is attached to the pole Y by rivets or other fastenings $B^3$. The spindle and sleeve serve as a sliding pivot for the rod A, and are held in the bracket $B^2$ by a nut $B^4$. It is desired that the rod A should tilt to a certain degree, the extremes being shown by dotted lines in Fig. 2. However, tilting too far is not desired, and to prevent this I have attached to the under surface of the pole Y the plate C, having the two arms $C^2$, between which the caster-rod A is adapted to play, the plate being held in place by bolts or other fastenings $C'$. The caster-rod, when being raised and lowered, has a sufficient play; but the pole should not raise too high, to prevent which, I have secured the stop $C^3$, against which the casing B abuts.

D is a lever which is pivoted to and projects beyond the standard or upright $Y'$, as at $D'$, and the rod A is pivotally connected to said projection. The lever D terminates in the handle $D^3$, near which, so that it can be easily grasped by the fingers, is the trigger E, which is pivoted as at $E'$.

$E^2$ is a screw-eye which is attached to the lever D, through which passes the pawl or dog $E^3$, having an eye or loop formed on its free end, to which is secured the connecting-rod $E^4$, the opposite end thereof being secured to the trigger E.

The dog $E^3$ is adapted to engage with the teeth of the segment F, of which there are any desired number, and is held therein by the spiral spring $E^5$. The segment F is rigidly secured to the upright Y by suitable devices, as $F'$.

The operation of the invention is as follows: When it is desired to raise or lower the front end of the machine or vehicle by the caster, the trigger E is pressed by the thumb, thus disengaging the pawl $E^3$, through the medium of the connecting-bar, from the teeth of the segment. The lever is then raised or lowered the desired distance, the thumb at the same time being removed from the trigger E, the spring $E^5$ necessarily forcing the dog or pawl $E^3$ into engagement with the teeth of the segment F.

Having described my invention and its operation, what I claim is—

1. The combination, with the pole of a vehicle of the class described, of a rod having a caster on one end, the opposite end thereof being pivoted to a lever, a sleeve having a spindle, a bracket secured to the pole and serving as a journal for the spindle, and a nut for holding the spindle in place, substantially as specified.

2. The combination, with a rod mounted on a caster and having stops, of a sleeve having a spindle journaled in a bracket on the pole of a vehicle, and devices for forcing said rod through the sleeve, substantially as specified.

3. The combination, with the pole of a vehicle of the class described, of a rod having a caster, a sleeve having a spindle, a bracket, and a bifurcated plate, and devices for forcing the rod through the sleeve and for rocking the sleeve on its spindle, substantially as specified.

4. The combination, with the upright of a vehicle of the class described having a toothed segment, of a pivoted lever and a pawl for engaging with the teeth of the segment, a rod pivotally connected with the lever and terminating in a caster, and a sleeve embracing the rod and pivotally attached to the pole, substantially as specified.

5. A sleeve for a caster-rod provided with a spindle projecting at a right angle therefrom, in combination with a bracket secured to the pole and having a journal for the spindle and means for retaining the spindle within the bracket, and devices for forcing the rod through the sleeve and for rocking the sleeve on its spindle, substantially as specified.

6. The combination, in a vehicle of the class described, of the caster-rod A, with the sleeve B, having the spindle B', which bears in the bracket B², secured to the pole Y, and the nut B⁴, and devices for forcing the rod through the sleeve, substantially as specified.

7. The combination, in a vehicle of the class described, of the caster-rod A, with the sleeve B, having spindle B', which bears in the bracket B², secured to the upper surface of the pole Y, the bifurcated plate C, secured on the opposite side thereof, and the nut B⁴, and devices for forcing the rod through the sleeve, substantially as specified.

In testimony whereof I affix my signature in presence of two witnesses.

SAMUEL ALBRIGHT.

Witnesses:
VIRTUS LUND,
JOHN McLAUGHLIN.